United States Patent Office 2,914,119
Patented Nov. 24, 1959

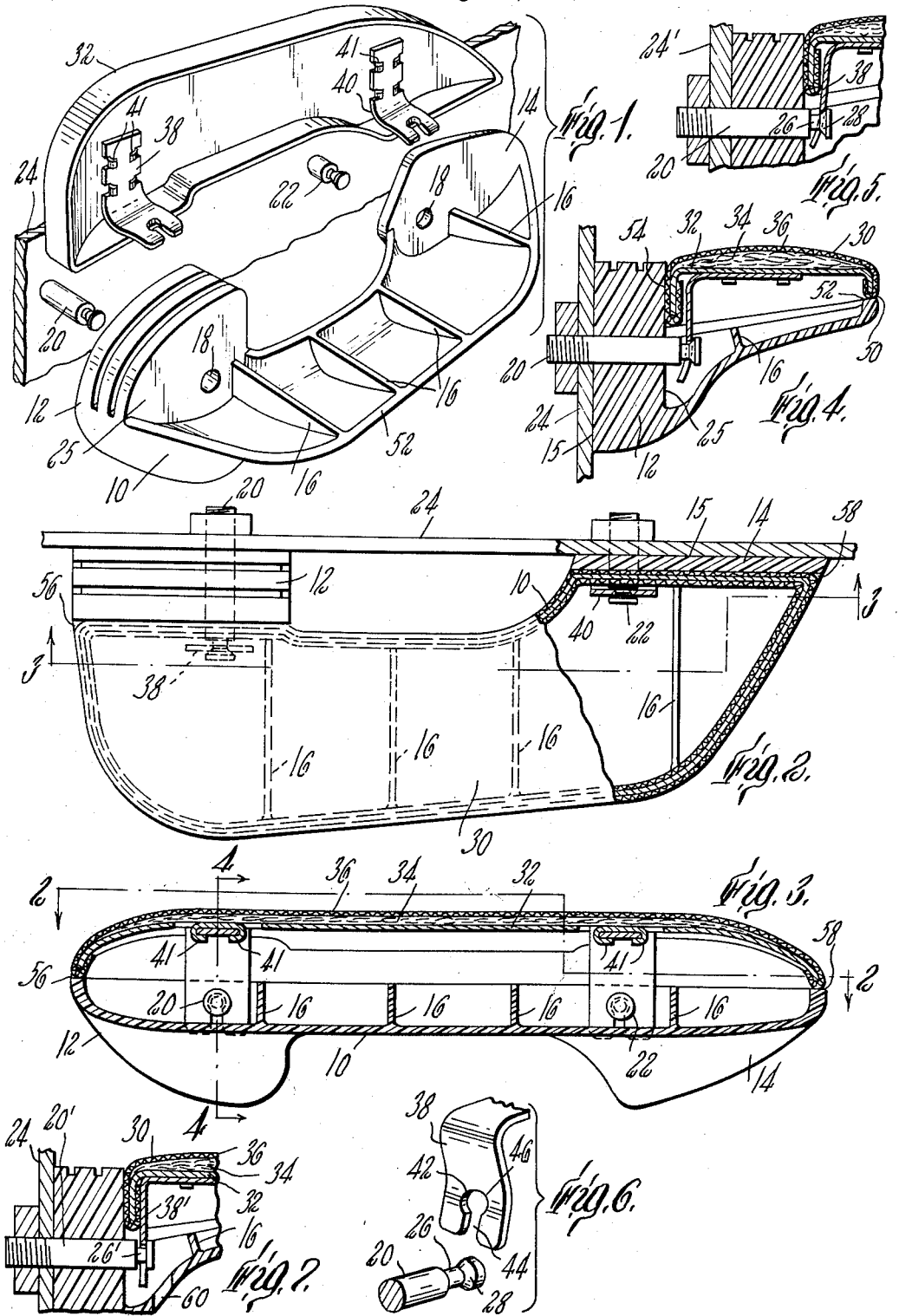

2,914,119
ARMREST

Frank J. Keefe, Jr., West Roxbury, Mass., assignor to Farrington Manufacturing Company, Needham Heights, Mass., a corporation of Massachusetts Application April 21, 1958, Serial No. 729,950

3 Claims. (Cl. 155—198)

This invention relates to armrests, such as may be used on automobiles, and more particularly to an improved and novel armrest structure and securing means therefor.

Armrests are commonly used on automobile doors and frequently combined with a door pull arrangement. Several considerations are involved in the design of such armrests. They must be sturdily constructed and must be able to be positioned securely on the door. Additionally, they must satisfy certain aesthetic precepts and safety requirements. Therefore resort to streamlining and similar dimensioning and to recessed fastening means of some type is frequent. The structure must be suitable for assembly by mass production techniques, thus the number of operations required and number of tools to be used must be minimized. And, above all, the structure must be susceptible to manufacture at competitive cost.

Further, in the conventional structure, the resilient cushioning member and covering therefor is subjected to great wear and abuse and may frequently require replacement. This is due to the somewhat excessive deformability of the conventional cushion structures.

Accordingly, it is an important object of this invention to provide an armrest which may be quickly and easily attached in a secure manner to a vehicle door without the use of tools and thus it is particularly advantageous for use in conjunction with the mass production assembly techniques of the automobile industry.

Another object of the invention is to provide an improved armrest structure which is sturdy and which provides a sturdy and substantially undeformable, yet comfortable, cushioned support.

A further object of the invention is to provide an armrest which is attached to the door in a secure manner by means which are concealed from view.

A further object of the invention is to provide, in an armrest structure, novel securing means by means of which the armrest may be easily applied to vehicle doors having varying thicknesses.

Still another object of the invention is to provide an improved armrest structure which may also be used as a door pull.

Other objects and advantages of the invention together with the features thereof will be better understood from the description of a preferred embodiment of the invention in conjunction with the accompanying drawings.

In the drawings.

Fig. 1 is a perspective view of parts, in disassembled relationship, of the armrest structure according to the preferred embodiment of the invention;

Fig. 2 is a top view, in partial section, of the assembled armrest, the section being taken along the lines 2—2 of Fig. 3;

Fig. 4 is a sectional end view of the assembled armrest taken along the lines 4—4 of Fig. 3;

Fig. 5 is an end view of the portion of the armrest structure securing means, illustrating the adaptability of the armrest securing means to mounting structures of varying thicknesses;

Fig. 6 is a perspective view of the securing elements according to the preferred embodiment of the invention; and Fig. 7 is a sectional end view portion of the armrest showing a modification of the preferred embodiment.

With reference to Fig. 1, the armrest has a base member 10 which is preferably manufactured from a suitable plastic material. The base member is C shaped in plan view and has end portions 12 and 14 which have vertical exterior surfaces 15 adapted to fit against a vehicle door wall or other suitable supporting structure. The base member may be U shaped in cross section such that an open top is provided and strengthening ribs 16 may be utilized to provide increased rigidity. The thickness of the end portions may vary as shown and as desired, for aesthetic considerations or for other reasons. Each end wall has a smooth bore aperture 18 therein which is adapted to receive a support element.

Support elements 20, 22 are secured to the vehicle wall 24 in any suitable manner, such as by welding. The length of these support elements is dependent on the thickness of the end portion with which it cooperates and are of such a length that they protrude beyond the interior walls 25 of the end portions when the exterior wall 15 is in contact with the wall 24. In the preferred embodiment the support element is a cylindrical rod which has a necked portion 26 adjacent its outer end. In addition, a beveled portion 28 is provided between the necked portion 26 and the end of the support element. These details of the support element are best seen in Fig. 6.

A cushion member 30 is adapted to be positioned on the base member 10. The cushion member 30 preferably includes a metal plate 32 which is stamped into hollowed-out, inverted U-shape in cross section configuration. This shell member may, of course, be made of other material than metal, if economic or other considerations warrant. A soft resilient member 34 of relatively thin sponge rubber or other suitable material lies over the top surface of the formed shell 32 and is secured thereto by means of an overlying suitable covering material 36, which is wiped over the formed plate 32 around the bottom edge thereof and adhesively secured along the inside marginal portion thereof. In this manner the cushion member has an appropriately resilient top surface which provides proper cushioning but which is not excessively deformable as its shape is primarily determined by the preformed metallic member 32.

Positioned on the cushion member are securing elements 38 and 40. These securing elements may be fixed to the plate 32 in any appropriate manner as by welding or brazing or by mechanical means such as tabs 41 formed out of the plate 32 and bent over the securing elements 38 and 40 so as to securely position them relative to the cushion member. The securing elements are preferably manufactured from resilient material such as spring steel and each has a slot 42 in the depending end thereof. The slot 42 is preferably dimensioned such that its lower end 44 will fit over the necked portion 26 of the support element and its upper portion 46 is enlarged such that it will bear against and may ride up on the beveled portion 28.

The armrest in assembled form is shown in Figs. 2, 3 and 4. In assembling the armrest, the base member 10 is first positioned on the support members 20 and 22, such that the members 20 and 22 extend through the apertures 18 and the necked portion extends slightly beyond the interior walls 25 of the end portions. The cushion member 70 is then placed on the base member 10 such that its lower outer edge 50 is adjacent the front wall surface 52 of the base portion and the lower portions of the slots 42 of the securing elements contact the support elements 20 and 22. The back portion of the cushion 30 is then pushed downward such that the lower parts of slots 42 are driven down and onto the necked portions 26 of the support elements. Due to the resilience of the securing elements, the rear surface 54 of the cushion member is driven rearwardly against the wall 25 against the resistance provided by the enlarged slot portions 46 engaging beveled portions of the support elements. The end portions 12 and 14 are thus firmly held against the vehicle wall 24 and are locked against inadvertent vertical release due to the inability of the slots 44, which are narrower than the diameter of the bevels 28, to rise past the bevels. Only by the exertion of considerable force can the resilient securing members 38 and 40 be cammed down the bevels so that the slots 44 clear the elements 20 and 22 and permit upward releasing movement. In this manner the cushion member is securely locked onto the support members 20 and 22, and the entire armrest assembly is positively secured to the vehicle door wall for reliable cooperation therewith. The armrest thus is easily attached to the door wall without the use of the tools and in a manner such that the securing elements are concealed from view.

Additionally, this embodiment may be utilized upon walls of varying thickness, as shown in Fig. 5. In that arrangement the wall 24' is substantially thicker than wall 24 in Fig. 4. Therefore, the support element 20 does not extend as far forward from the outer surface of the wall 24'. However, due to the curvature or camber of the securing element 38, the lower end of slot 42 will still engage the necked or beveled portions of the support elements 20, 22. As the cushion element 30 is driven downwardly the securing element 38 will flex into a position such that the necked portion 26 is driven into the slot 44 and the enlarged portion 46 of the slot 42 engages the beveled portion and is locked securely thereon.

A modification of the securing structure is shown in Fig. 7. The support element 20' is provided with a necked portion 26' but without a beveled portion. The securing element 38' is substantially straight and has a slot of appropriate dimensions therein which engages the necked portion 26' such that the cushion element 30 and the base element 10 are fastened to the vehicle wall 24 in a secure and rigid manner. If desired, the slot may be elongated and dimensioned such that the securing elements, due to their resilient nature, act to clamp the support elements firmly.

The armrest may be disasssembled and removed from the vehicle wall simply by inserting a screw driver or other suitable lever instrument at points 56 and 58 between the base member 10 and the cushion member 30 and exerting sufficient force to cam the elements 38 and 40 rearwardly to clear the bevels and permit the rear edges of the cushion member 30 to rise. The armrest is then easily removed from the vehicle door. An alternative method of removing the cover element is to provide apertures 60 in the base member below the securing elements 38' and 40', as shown in Fig. 7. An appropriate tool may be inserted through the aperture 69, placed against the securing element 38' and given a sharp blow such that the securing element is driven upwards from the support element 20, thus freeing the cushion member and permitting the removal of the armrest from the door.

It is thus seen that the invention provides a rigid armrest which may be securely attached to a vehicle door or other appropriate supporting structure without the use of tools. The armrest may be manufactured by suitable mass production methods and the mounting method is appropriate for mass production techniques. Additionally, the structure is adaptable to a number of different mounting surfaces.

Other advantages of the invention and additional modifications of the preferred embodiment will be apparent to those skilled in the art. It is not intended that the invention be limited to the embodiments herein disclosed or to details thereof and departures may be made therefrom within the spirit and scope of the invention as defined in the following claims.

I claim:

1. A two piece vehicle arm rest comprising a top member and a bottom member adapted to be attached in cooperating relationship to an inner surface of a vehicle, one of said members having a rear wall presenting a surface adapted to abut a generally vertical inner surface of the vehicle to which the arm rest is to be attached, aperture means in the rear wall of said one member to accommodate supporting means secured to and projecting generally horizontally from said inner surface inwardly of said vehicle so that said one member may be disposed in supported relationship on said supporting means and combined locking means for securely attaching the arm rest to said vehicle door with said rear wall surface of said one member positioned in snug engagement with the inner surface of said vehicle and locking said top and bottom members together in cooperating relationship, said combined locking means comprising securing means attached to and extending generally vertically from the other of said members for frictionally engaging a portion of said supporting means projecting beyond said aperture means when said rear wall surface is abutting the inner surface of said vehicle.

2. An arm rest structure adapted to be mounted on a vehicle door, comprising a pair of support elements secured to and projecting generally horizontally from a generally vertical inner surface of said door, each said element having an inner end disposed inwardly of said vehicle and having a necked portion adjacent said inner end, a base member having a rear wall including a rear surface adapted to abut the vertical inner surface of said vehicle door and a front surface, a pair of spaced apertures in said rear wall adapted to accommodate said support elements so that said base member may be mounted in supporting relationship on said support elements with the necked portions of said elements positioned slightly beyond said front surface when said rear surface abuts the vehicle's inner surface, and a cushion member adapted to be positioned on said base member including a rear wall portion adapted to abut the front surface of the rear wall of said base member and combined locking means comprising a pair of strips of resilient material secured to and extending vertically downwardly from said cushion member adjacent said rear wall portion thereof, each said strip having a longitudinally extending slot portion adjacent the lower end thereof of a width slightly greater than the width of said necked portion, each said slot portion being adapted to frictionally engage the necked portion of the associated support element in cooperating relationship therewith for urging the rear wall portion of said cushion member against said front surface of said base member to position the rear wall surface thereof in snug engagement with the inner surface of said vehicle door, and simultaneously securely locking said cushion member to said base member.

3. An arm rest structure adapted to be mounted on a vehicle door, comprising a pair of cylindrical support rods secured to and projecting generally horizontally from a generally vertical inner surface of said door, each said rod having an inner end disposed inwardly of said vehicle and having a necked portion adjacent said inner end, said necked portion including a beveled transition surface, a molded plastic base member, C-shaped in plan view and U-shaped in cross connection, having a rear wall including a rear surface adapted to abut the vertical inner surface of said vehicle door and a front surface, a pair of spaced apertures in said rear wall adapted to accommodate said support rods so that said base member may be mounted in supporting relationship on said support rods with the necked portions of said rods positioned slightly beyond said front surface when said rear surface abuts the vehicle's inner surface, and a cushion member adapted to be positioned on said base member comprising a formed metal base, a resilient material positioned on top of said metal base and a cover over said resilient material and secured to said metal base, said cushion member including a rear wall portion adapted to abut the front surface of the rear wall of said base and combined locking means comprising a pair of strips of resilient material secured to and extending vertically downwardly from said metal base adjacent said rear wall portion thereof, each said strip having a generally circular aperture portion adjacent the lower end thereof and a slot portion of a width slightly greater than the diameter of said necked portion connecting the lower end of the strip with said aperture portion, each said slot portion being adapted to be slid over the necked portion of the cooperating rod so that the associated aperture portion is disposed in frictional engagement with the beveled surface of the associated support rod in cooperating relationship therewith for urging the rear wall portion of said cushion member against said front surface of said base member, thus positioning the rear wall surface thereof in snug engagement with the inner surface of said vehicle door, and simultaneously securely locking said cushion member to said base member.

References Cited in the file of this patent

UNITED STATES PATENTS

| | | |
|---|---|---|
| 664,415 | Knox | Dec. 25, 1900 |
| 1,860,520 | Zink | May 31, 1932 |
| 2,563,222 | Doty | Aug. 7, 1951 |
| 2,601,677 | Wettlaufer | June 24, 1952 |
| 2,673,591 | Cox | Mar. 30, 1954 |
| 2,677,415 | Brink | May 4, 1954 |
| 2,703,602 | Greenstadt | Mar. 8, 1955 |